United States Patent [19]

Iriguchi et al.

[11] Patent Number: 6,150,434
[45] Date of Patent: Nov. 21, 2000

[54] SILICA BASE PARTICLES AND PRODUCTION PROCESS FOR SAME

[75] Inventors: Jiro Iriguchi, Kakogawa; Shuji Shimizu, Himeji; Yasuhiro Yamamoto, Himeji; Hideki Oishi, Himeji, all of Japan

[73] Assignee: Nippon Shokubai Co Ltd, Osaka, Japan

[21] Appl. No.: 09/208,259

[22] Filed: Dec. 9, 1998

[30] Foreign Application Priority Data

Dec. 10, 1997 [JP] Japan ................................. 9-339725

[51] Int. Cl.$^7$ ........................................ C08K 9/00
[52] U.S. Cl. ............................. 523/216; 523/217
[58] Field of Search ........................ 523/216, 217

[56] References Cited

U.S. PATENT DOCUMENTS

| | | | |
|---|---|---|---|
| 4,977,029 | 12/1990 | Brown | 428/429 |
| 5,635,557 | 6/1997 | Kimura | 524/493 |

OTHER PUBLICATIONS

Japanese Laid–Open Publication No. 310965/1993 and English Abstract, published Nov. 22, 1993.
Japanese Laid–Open Publication No. 331357/1993 and English Abstract, published Dec. 14, 1993.
Japanese Laid–Open Publication No. 331300/1993 and English Abstract, published Dec. 14, 1993.
Japanese Patent Publication No. 91400/1995 and English Abstract, published Jun. 22, 1993.
Japanese Laid–Open Publication No. 65404/1994 and English Abstract, published Mar. 8, 1994.

*Primary Examiner*—Paul R. Michl

[57] ABSTRACT

Provided is a silica base particle having an average particle diameter of 0.01 to 10 µm, wherein carboxylic esters are present on the surface of the above particle in a proportion falling in a range of 0.05 to 10% by weight based on the weight of the above particle. A polyester film containing the above silica base particles shows an excellent lubricant property and scratch resistance.

5 Claims, No Drawings

SILICA BASE PARTICLES AND PRODUCTION PROCESS FOR SAME

The present invention relates to a silica particle used as a lubricant for a polyester film. More specifically, the present invention relates to a silica base particle which has an excellent affinity for polyester and is useful for producing a polyester film having an excellent scratch resistance.

Polyester films, for example, saturated polyester films, particularly polyethylene terephthalate (hereinafter, abbreviated as PET) films have excellent physical properties. Among them, biaxially oriented polyester films containing inorganic fine particles as a lubricant are widely used for various magnetic tapes, photographs, an OHP and lamination of metallic articles such as a laminated can. Silica base particles have an excellent performance as a lubricant used here and have so far widely been used.

In recent years, however, a scratch resistance has severely been required in production processes of magnetic tapes and laminated cans and has not been satisfied with conventional silica base particles. The term scratch means scratches formed at a contact part of a film and scratches formed by abrasive powder, and primary cause thereof originates in falling of silica base particles from a polyester film.

A main cause of this falling originates in a lack in an affinity of the silica base particles for polyester, and there have so far been investigated particles of miscellaneous forms described in Japanese Laid-Open Publication 310965/1993 and silica particles modified by using specific materials described in Japanese Laid-Open Publication 331357/1993 and Japanese Laid-Open Publication 331300/1993. However, satisfactory effects have not been obtained.

The present invention has been made in light of the situations described above, and the subject of the present invention is to solve problems such as a scratch resistance which has been unsatisfactory in polyester films in which conventional silica base particles are used as a lubricant.

Accordingly, a first object of the present invention is to provide a silica base particle which has an excellent affinity for polyester and is useful as a lubricant, particularly to provide a silica base particle which is useful as an additive for improving a scratch resistance of a polyester film.

A second object of the present invention is to provide an efficient production process for the silica base particle described above.

A third object of the present invention is to provide a glycol dispersion of silica base particles which are useful as a lubricant for improving a scratch resistance of a polyester film.

A fourth object of the present invention is to provide a polyester film which contains silica base particles having an excellent affinity for polyester and useful as a lubricant and which is excellent in a scratch resistance.

A fifth object of the present invention is to provide a metallic article laminated with the polyester film described above which is excellent in a scratch resistance.

A first invention of the present invention relates to a silica base particle (hereinafter referred to as a silica base particle A) having an average particle diameter of 0.01 to 10 $\mu$m, wherein carboxylic esters are present on the surface of the above particle in a proportion falling in a range of 0.05 to 10% by weight based on the weight of the above particle.

It is preferred that the silica base particle A described above is spherical and that the ratio of a length of the particle to a breadth thereof falls in a range of 1.00 to 1.20 and the variation coefficient of the particle size distribution is 10% or less.

The carboxylic esters described above are preferably aromatic carboxylic esters, more preferably aromatic dicarboxylic diesters, and particularly preferably terephthalic diesters and/or naphthalenedicarboxylic diesters.

A second invention of the present invention relates to a production process for the silica base particle A described above, comprising the steps of:

dispersing silica base particles having an average particle diameter of 0.01 to 10 $\mu$m in an alcohol base solvent to obtain an alcohol dispersion of the silica base particles, then adding carboxylic esters to said dispersion, and heating the mixture to a temperature falling in a range of 50 to 350° C.

A third invention of the present invention relates to a glycols dispersion of the silica base particles A, wherein the silica base particles A described above are dispersed in a glycols solvent in a concentration of 1 to 50% by weight.

A fourth invention of the present invention relates to a polyester film containing the silica base particles A described above in a proportion of 0.001 to 0.5% by weight.

A fifth invention of the present invention relates to a metallic article laminated with the polyester film described above.

The present invention shall be explained below in further detail.

The silica base particle A according to the present invention is a silica base particle which has an average particle diameter of 0.01 to 10 $\mu$m and in which carboxylic esters are present on the surface of the above particle in a proportion falling in a range of 0.05 to 10% by weight based on the weight of the above particle.

The term "silica base" in the silica base particle described in the present invention is defined by an oxygen-containing compound of silicon in which a three-dimensional net work of —Si—O— formed primarily via a bond of a silicon atom with an oxygen atom is an essential structural element. Accordingly, a composite oxide particle containing at least one metal element other than a silicon atom, for example, alkaline metal, a particle in which not only a silicon atom is bonded to an oxygen atom but also a part of silicon atoms is bonded to carbon atoms and other inorganic elements or adsorbs them, and a combined particle of the oxygen-containing compound of silicon described above with various organic compounds are included as well in the concept of the silica base particle according to the present invention.

The silica base particle A has an average particle diameter falling in a range of 0.01 to 10 $\mu$m. The average particle diameter of smaller than 0.01 $\mu$m reduces a lubricant effect obtained when it is used as a lubricant for a polyester film. On the other hand, the average particle diameter of larger than 10 $\mu$m may cause a fish eye when it is used as a lubricant for a polyester film. The average particle diameter falls preferably in a range of 0.03 to 5 $\mu$m, more preferably 0.05 to 3 $\mu$m.

The carboxylic esters which are allowed to be present on the surface of the silica base particle A shall not specifically be restricted and include terephthalic diesters (for example, dimethyl, diethyl, dipropyl or di(hydroxyethyl) terephthalate), naphthalenedicarboxylic diesters (for example, dimethyl, diethyl, dipropyl or di(hydroxyethyl) naphthalenedicarboxylate), and aromatic carboxylic esters such as benzoic esters; and aliphatic carboxylic esters such as stearic esters, oleic esters and palmitic esters.

The aromatic carboxylic esters are preferred from a viewpoint of an affinity for polyester, and the aromatic dicarboxylic diesters are more preferred. In particular, terephthalic diesters and/or naphthalenedicarboxylic diesters are preferred since they have the highest affinity and do not exert an adverse effect on a polyester film even if residues which are not adsorbed are present.

If the carboxylic esters described above contain carboxylic acids which are not esterified, it is difficult to allow the esters to adsorb on the silica particles, and coagulation of the silica particles is brought about by a change in pH in a certain case.

Accordingly, the carboxyl groups are esterified in a proportion of preferably at least 80% or more, more preferably 90% or more and further preferably 95% or more.

The amount of the carboxylic esters which are allowed to be present on the surface of the silica base particle A is 0.05 to 10% by weight based on the weight of the silica base particles. The amount of less than 0.05% by weight causes the particle to be lacking in an affinity for polyester. On the other hand, the amount of more than 10% by weight makes it easy to cause the silica base particles to coagulate and is liable to damage the storage stability and cause voids when using it as a lubricant for a polyester film. Accordingly, the amount falls preferably in a range of 0.10 to 8% by weight, more preferably 0.15 to 8% by weight, further preferably 0.15 to 6% by weight and particularly preferably 0.4 to 6% by weight.

When the silica base particle A is used as a lubricant for a polyester film, the sphericity thereof raises the lubricant effect, and therefore the ratio of a length of the particle to a breadth thereof falls preferably in a range of 1.00 to 1.20, more preferably 1.00 to 1.10 and particularly preferably 1.00 to 1.05.

Further, when the silica base particle A is used as a lubricant for a polyester film, the sharper particle size distribution makes the performance as a lubricant better, and therefore the variation coefficient of the particle size distribution falls preferably in a range of 10% or less, more preferably 8% or less and particularly preferably 6% or less. The variation coefficient is obtained from the following equation:

variation coefficient (%)(standard deviation/average value)×100

The applicable range of the silica base particle A as a lubricant shall not be restricted to a polyester film, and it can suitably be used as well for olefin films such as, for example, polyethylene and polypropylene, and other various films.

A process for producing the silica base particle A shall not specifically be restricted, and a process in which silica base particles are dispersed in an alcohol base solvent to obtain an alcohol base dispersion of the silica base particles and then carboxylic esters are added to the above dispersion, followed by heating the mixture to a temperature falling in a range of 50 to 350° C. is the simplest and provides a high adsorption coefficient. Accordingly, it is recommendable.

A silica base particle which is a raw material particle for the silica base particle A shall not specifically be restricted, and a silica particle obtained by hydrolysitic condensation reaction of (tetra and/or tri)alkoxysilane under the presence of a basic catalyst is preferred since optional particle diameter and the sharp particle size distribution can be obtained, and impurities such as alkaline metals are small.

Aliphatic alcohols such as methanol, ethanol, propanol and butanol are preferred as the alcohol base solvent described above, and methanol and/or ethanol are more preferred. Water and a basic catalyst which are used in subjecting alkoxysilane to hydrolysitic condensation in the alcohol base solvent described above to produce a silica base particle may be contained therein.

Further, glycols such as ethylene glycol may be contained as well. The concentration of the silica particles in the alcohol base solvent described above falls usually in a range of 5 to 30% by weight.

The addition amount of the carboxylic esters in the production process described above is preferably 1.05 to 10 times as much as the amount to be adsorbed on the silica base particle. The amount of smaller than 1.05 time causes the adsorbed amount to be smaller than the target, and the amount of more than 10 times causes the adsorbed amount to be unchanged only to remain as an unreacted matter.

A heating temperature in the production process described above falls usually in a range of 50 to 350° C. The temperature of lower than 50° C. reduces the adsorptivity of the carboxylic esters, and the temperature of higher than 350° C. causes desorption of the carboxylic esters. The temperature falls preferably in a range of 100 to 300° C., more preferably 150 to 250° C.

The heating time falls usually in a range of 0.5 to 5 hours. Further, when preparing the glycol dispersion of the silica base particles, glycol may be substituted for the alcohol base solvent at the same time as this heating.

When the silica base particle A is used as a lubricant for a polyester film, it is preferred that the silica particle A is simply dispersed without coagulating, and therefore the form of the silica base particle A is preferably a liquid dispersion in which dispersion is easy, rather than powder. In particular, the dispersion of glycols which are raw material for polyesters is preferred since it has the following advantages:

(1) the particles are less liable to coagulate therein as compared with other liquid matters such as water, and it can be handled in a simple dispersion state, and (2) glycols can be used as raw materials for saturated polyester, and therefore an adverse effect such as mixing of impurities is not exerted on a film.

The glycols described above include ethylene glycol, propylene glycol, tetramethylene glycol and pentamethylene glycol. Among them, ethylene glycol is preferred since it is readily available and provides a small change in a solid matter concentration due to volatilization, so that it can easily be handled.

The concentration of the silica base particle A in the glycol dispersion described above is usually 1 to 50% by weight. The concentration of lower than 1% by weight is economically disadvantageous since the transportation cost of the silica base particle A per unit weight is raised. On the other hand, the concentration exceeding 50% by weight causes coagulation in a certain case. The concentration falls preferably in a range of 5 to 40% by weight, more preferably 10 to 30% by weight. The silica base particle A coagulates more easily than conventional silica base particles adsorbing no carboxylic esters, and therefore the concentration thereof in the glycol dispersion has to be lowered.

The polyester film according to the present invention contains the silica base particle A in a proportion of 0.001 to 0.5% by weight. The above polyester film has an excellent lubricant property and anti blocking property and is further provided with an excellent scratch resistance which has not been obtained in films containing conventional silica base particles.

The polyesters used in the present invention shall not specifically be restricted and are saturated polyesters usually comprising aromatic dicarboxylic acids as a principal acid component and aliphatic saturated glycols as a principal glycol component. The aromatic dicarboxylic acids described above include, for example, terephthalic acid, naphthalenedicarboxylic acid, isophthalic acid, diphenylethanecarboxylic acid, diphenyldicarboxylic acid, diphenyletherdicarboxylic acid, diphenylketonedicarboxylic acid, diphenylsulfonedicarboxylic acid, and anthracenedicarboxylic acid. The glycols include, for example, ethylene glycol and polymethylene glycols having 2 to 10 carbon atoms such as trimethylene glycol, tetramethylene glycol, pentamethylene glycol, hexamethylene glycol and decamethylene glycol. In general, they are polyethylene terephthalate or polyethylene naphthalate. These films of saturated polyester are widely used for magnetic recording tapes, metal lamination, food packaging, photographs, general packaging and OHP.

The amount of the silica base particle A added to the polyester film falls usually in a range of 0.001 to 0.5% by weight. The amount of smaller than 0.001% by weight does not provide a satisfactory lubricant property and anti blocking property. On the other hand, the amount of more than 0.5% by weight causes the effects to remain unchanged and therefore is economically disadvantageous. The amount falls preferably in a range of 0.01 to 0.3% by weight, more preferably 0.05 to 0.2% by weight.

A method for adding the silica base particles A to a polyester film shall not specifically be restricted as long as the silica base particles A are dispersed evenly in the film. A method in which the glycol dispersion of the silica base particles A is added in producing polyester provides the best dispersibility and therefore is recommendable.

Other inorganic additives may be contained in the polyester film described above as long as the characteristics of the silica base particle A are not damaged. Examples of these inorganic additives include calcium carbonate, clay, alumina, titania and zirconia.

In particular, calcium carbonate which is inexpensive and has an excellent form and particle size distribution is commercially available in the market, and therefore use thereof in combination with the silica base particle A is recommended.

The metallic article according to the present invention is a metallic article laminated with a polyester film containing the silica base particle A in a proportion of 0.001 to 0.5% by weight. The above metallic article has an excellent lubricant property and is further provided with an excellent scratch resistance particularly in molding.

Plates of blik, tin-free steel and aluminum are suitable for a metal plate which is a material for the metallic article described above. A heat sealing method and an adhesive method are used as a method for laminating the polyester film on the metal plate.

The thickness of the polyester film laminated on the metal plate is usually 10 to 40 $\mu$m. A copolymerized polyester film produced by using terephthalic acid as a principal acid component in combination with isophthalic acid as a secondary acid component can display more excellent scratch resistance and therefore is preferred.

The above metallic article is suitable for production of metallic cans including a deep drawing process since the polyester film containing the silica base particles A displays an excellent scratch resistance.

The present invention shall be explained below with reference to examples, but the present invention shall not be restricted to these examples.

Measurements in the examples were carried out by means of the following instruments.

[Measurement of particle diameter]

Centrifugal particle size distribution measuring apparatus: SA-CP3 manufactured by Shimadzu Mfg. Co., Ltd.

[Determination of carboxylic esters]

Gas chromatography: GC-17A manufactured by Shimadzu Mfg. Co., Ltd.

Column: capillary column manufactured by J & W Co., Ltd.

REFERENCE EXAMPLE (preparation of silica particles)

Japanese Patent Publication 91400/1995 was referred to carry out a reference example in the following manner.

A glass-made reactor of 30 liter equipped with a stirrer, a dropping port and a thermometer was charged with ethanol (16.55 liter) and a 28% ammonia aqueous solution (3.34 kg) to stir the solution. This mixed solution was controlled to a temperature of 20 ±0.5° C., and a mixed solution prepared by diluting tetraethoxysilane (1.61 kg) with ethanol (3 liter) was dropwise added from the dropping port in one hour while stirring.

After finishing dropping, stirring was continued for 2 hours to carry out hydrolysis, whereby a suspension was obtained. The resulting particles had an average particle diameter of 0.53 $\mu$m and a variation coefficient of 2%. Further, the solvent was distilled off from the resulting suspension by means of a rotary evaporator to obtain a silica particle dispersion having a silica particle concentration of 10%.

Example 1

Dimethyl terephthalate of 2.4 g (2% by weight based on the weight of the silica particles) was added to the silica particle dispersion (1200 g) obtained in the reference example and mixed well to prepare a raw material slurry. Then, a glass-made four neck reactor with a content volume of 1 liter equipped with a stirrer and a solvent-distilling apparatus was charged with ethylene glycol of 485 g and heated up to 90° C. while stirring. Supply of the raw material slurry and distillation of the solvent were continued while heating and stirring so that the solution was maintained at a temperature of 90° C., and thus the whole amount of the raw material slurry was added in 3 hours.

Then, the solution was heated to gradually elevate the temperature thereof to distill the solvent off, and thus the temperature was elevated up to 150° C. in one hour. Stirring was still continued at 150° C. for 2 hours, and then the solution was cooled down to a room temperature to obtain an ethylene glycol dispersion (1) of the silica base particles A. Shown in Table 1 were the concentration, shape, length/breadth ratio of the particle and variation coefficient of the silica base particle A contained in the ethylene glycol dispersion, and the amount of carboxylic ester present on the surface of the silica base particle A. The amount of the carboxylic ester present on the surface of the silica base particle A was calculated by determining the amount of the carboxylic ester contained in a supernatant obtained by treating the ethylene glycol dispersion of the silica base particle A by means of a centrifugal separator at 2000 rpm for 10 minutes, wherein the balance thereof was considered the amount of the carboxylic ester present on the surface of the silica base particles A, and the amount thereof was shown by % by weight based on the weight of the silica base particle A. Next, after the ethylene glycol dispersion was left for standing at a room temperature for 10 days, it was 5 stirred well and further dispersed by means of a supersonic wave, and then the average particle diameter was measured. The result thereof is shown in Table 2.

Examples 2 to 5

The ethylene glycol dispersions (2) to (5) of the silica base particles A were obtained respectively in the same manner as in Example 1, except that the kind of the carboxylic esters was changed to carboxylic esters described in Table 1. The results thereof are shown in Table 1 and Table 2 as is the case with Example 1.

Examples 6 to 7

The same procedure as in Example 1 was repeated to obtain the ethylene glycol dispersions (6) and (7) of the silica base particles A, except that the addition amount of dimethyl terephthalate was changed to 1.2 g and 9.6 g (1% by weight and 8% by weight based on the weight of the silica base particle A) respectively. The results thereof are shown in Table 1 and Table 2 as is the case with Example 1.

Comparative Example 1

The same procedure as in Example 1 was repeated to obtain an ethylene glycol dispersion (1') of comparative silica base particles, except that the carboxylic esters were not added.

Comparative Example 2

The same procedure as in Example 1 was repeated to obtain an ethylene glycol dispersion (2') of comparative silica base particles, except that the addition amount of dimethyl terephthalate was changed to 24.0 g (20% by weight based on the weight of the silica base particle A). The result thereof is shown in Table 1 and Table 2 as is the case with Example 1.

Example 8

Dimethyl terephthalate (0.4 g: 2% by weight based on the weight of the silica base particle A) was added to the ethylene glycol dispersion (1') of the comparative silica base particles obtained in Comparative Example 1, and the mixture was stirred at a room temperature for 5 hours to obtain an ethylene glycol dispersion (8) of the silica base particles A. The result thereof is shown in Table 1 and Table 2 as is the case with Example 1.

Example 9

The ethylene glycol dispersion (1) of the silica base particles A obtained in Example 1 was used to prepare a polyethylene terephthalate film, and the performance test was carried out.

A reactor was charged with dimethyl terephthalate 1000 g, the ethylene glycol dispersion (1) 2.5 g (0.5 g as the silica particle) of the silica base particles A, ethylene glycol 600 g and magnesium acetate tetrahydrate 0.9 g and heated to elevate the temperature to carry out transesterification while distilling methanol off. The temperature was elevated up to 230° C. in 4 hours after starting the reaction. Then, phosphoric acid 0.3 g and antimony trioxide 0.4 g were added to carry out condensation polymerization for 4 hours, whereby polyethylene terephthalate having a limiting viscosity of 0.60 to 0.63 was obtained.

Next, the above polyethylene terephthalate was melt-extruded at 290° C. to obtain an amorphous sheet, and the sheet was stretched by 3.5 times in a running direction (longitudinal direction) of the sheet and a lateral direction thereof respectively at 110° C. It was further stretched by 1.1 time in the longitudinal direction at 130° C. and subjected to thermal treatment at 220° C. for 3 seconds, whereby a polyester film (1) having a thickness of 15 μm was obtained.

Appearance observation (presence of voids) and the following scratch resistance test of these films were carried out. The results thereof are shown in 30 Table 3.

[Scratch resistance test]

The polyester film cut to a width of 10 mm was run on a plastic-made pin while allowing the film to be rubbed once

TABLE 1

| No. of Dispersion | Carboxylic esters present on particle surface | Silica particle concentration (% by wt) | Shape | Length/breadth ratio of particle | Variation coefficient (%) | Amount of carboxylic esters present on silica particle surface in dispersion |
|---|---|---|---|---|---|---|
| (1) | Dimethyl terephthalate | 20.5 | Sphere | 1.02 | 2 | 1.3 |
| (2) | Di(hydroxyethyl) terephthalate | 20.4 | Sphere | 1.02 | 2 | 1.6 |
| (3) | Dimethyl 2,6-naphthalenedi-carboxylate | 20.2 | Sphere | 1.02 | 2 | 1.2 |
| (4) | Methyl benzoate | 20.8 | Sphere | 1.02 | 2 | 0.8 |
| (5) | Methyl stearate | 20.1 | Sphere | 1.02 | 2 | 0.5 |
| (6) | Dimethyl terephthalate | 20.8 | Sphere | 1.02 | 2 | 0.6 |
| (7) | Dimethyl terephthalate | 20.5 | Sphere | 1.02 | 2 | 7.0 |
| (8) | Dimethyl terephthalate | 20.4 | Sphere | 1.02 | 2 | 0.1 |
| (1') | No addition | 20.3 | Sphere | 1.02 | 2 | No addition |
| (2') | Dimethyl terephthalate | 20.6 | Sphere | 1.02 | 2 | 13.5 |

TABLE 2

| No. of Dispersion | Carboxylic esters present on particle surface | Coagulation after left for standing for 10 days (visual) | Particle diameter after left for standing for 10 days (μm) |
|---|---|---|---|
| (1) | Dimethyl terephthalate | None | 0.53 |
| (2) | Di(hydroxyethyl) terephthalate | None | 0.53 |
| (3) | Dimethyl 2,6-naphthalenedicarboxylate | None | 0.53 |
| (4) | Methyl benzoate | None | 0.53 |
| (5) | Methyl stearate | None | 0.53 |
| (6) | Dimethyl terephthalate | None | 0.53 |
| (7) | Dimethyl terephthalate | Slightly present | 0.60 |
| (8) | Dimethyl terephthalate | None | 0.53 |
| (1') | No addition | None | 0.53 |
| (2') | Dimethyl terephthalate | Present | 0.86 | thereon at a tension of 100 g, a contact angle of 90 degree and a running speed of 150 m/minute.

Then, aluminum was deposited on the rubbed surface thereof, and the amount of scratches was visually judged by means of a stereoscopic microscope to classify it to the following ranks:

Rank 1: no scratches are observed
Rank 2: scratches are slightly observed
Rank 3: a few scratches are observed
Rank 4: a lot of scratches are observed Examples 10 to 16

Polyester films (2) to (8) were prepared respectively in the same manner as in Example 9, except that the ethylene glycol dispersions (2) to (8) of the silica base particles A obtained in Examples 2 to 8 were substituted for the ethylene glycol dispersion (1) of the silica base particles A, and the performance test was carried out respectively. The results thereof are shown in Table 3.

Comparative Examples 3 to 4

The same procedure as in Example 9 was repeated to prepare comparative polyester films (1') to (2'), except that the ethylene glycol dispersions (1') to (2') of the comparative silica base particles obtained in Comparative Examples 1 to 2 were substituted for the ethylene glycol dispersion (1) of the silica base particles A, and the performance test was carried out respectively. The results thereof are shown in Table 3.

TABLE 3

| No. of Poly-ester film | Appearance (presence of voids) | Scratch resistance (amount of scratches by visual judgement) |
| --- | --- | --- |
| (1) | Good | Rank 1 |
| (2) | Good | Rank 1 |
| (3) | Good | Rank 1 |
| (4) | Good | Rank 2 |
| (5) | Good | Rank 2 |
| (6) | Good | Rank 1 |
| (7) | Slightly present | Rank 2 |
| (8) | Good | Rank 2 |
| (1') | Good | Rank 4 |
| (2') | Present a little | Rank 3 |

Example 17

The polyester film (1) obtained in Example 9 was stuck on both sides of tin-free steel with a plate thickness of 0.25 mm heated to 230° C. and cooled by water. Then, it was cut to a disc form having a diameter of 150 mm, and the disc was subjected to deep drawing working at three stages by means of a deep drawing die and a punch to prepare a side surface seamless vessel having a diameter of 60 mm. The above vessel was observed to evaluate a deep drawing workability according to the following criteria. The result thereof is shown in Table 4.

[Evaluation criteria of deep drawing workability]

Rank 1: both internal and outside surfaces of the film are worked in a normal state, and no chips are found on the die and the punch.

Rank 2: whitening or rupture is found on the film, or chips are observed on the die and the punch.

Rank 3: whitening or rupture is found on the film, and chips are stuck on the die and the punch.

Rank 4: whitening or rupture is found on the film, and fine scratches are formed on the die and the punch.

Examples 18 to 24

Vessels were prepared in the same manner as in Example 17, except that the polyester films (2) to (8) obtained in Examples 10 to 16 were substituted for the polyester film (1). The evaluation results thereof are shown in Table 4.

Comparative Examples 5 to 6

Vessels were prepared in the same manner as in Example 17, except that the comparative polyester films (1') to (2') obtained in Comparative Examples 3 to 4 were substituted for the polyester film (1). The evaluation results thereof are shown in Table 4.

TABLE 4

| No. of poly-ester film | Evaluation of deep drawing workability (visual judgement) |
| --- | --- |
| (1) | Rank 1 |
| (2) | Rank 1 |
| (3) | Rank 1 |
| (4) | Rank 2 |
| (5) | Rank 2 |
| (6) | Rank 1 |
| (7) | Rank 2 |
| (8) | Rank 3 |
| (1') | Rank 4 |
| (2') | Rank 3 |

As shown in the results summarized in Table 3 and Table 4, the films using the silica base particles A in which the carboxylic esters are allowed to be present on particle surfaces are excellent in a scratch resistance. Among them, the silica base particles A in which aromatic carboxylic esters, particularly aromatic dicarboxylic diesters are allowed to be present are excellent. The silica particles in which the prescribed amount or more of the carboxylic esters are allowed to be present coagulate as shown in Table 2, and the film results in bringing about defect on appearance and being inferior in a scratch resistance. Further, mere mixing of the silica particles with the carboxylic ester with-out heating reduces the amount of the carboxylic ester present on the surface of the particle and does not provide the satisfactory performance.

According to the examples described above, the silica base particle A of the present invention is excellent in an affinity for resins such as polyester and therefore can provide the films with an excellent lubricant property and blocking preventive property when it is added to various films of polyester and the like.

Further, it can provide the films as well with an excellent scratch resistance (effect to reduce falling of the particles from the films when brought into contact with foreign matters). Accordingly, it can be found that the silica base particle A is a useful material as a lubricant, a blocking preventive and a scratch resistance-improving agent for films.

Further, it can be found as well from the examples described above that the polyester film according to the present invention is excellent in a lubricant property, a blocking preventive property and a scratch resistance.

In addition, it can be found from the examples described above that the metallic articles according to the present invention is excellent in a lubricant property and a scratch resistance and displays an excellent scratch resistance particularly in deep drawing working.

What is claimed is:

1. A silica base particle having an average particle diameter of 0.01 to 10 μm, wherein aromatic dicarboxylic diesters are present on the surface of said particle in a proportion falling in a range of 0.05 to 10% by weight based on the weight of said particle.

2. The silica base particle as described in claim 1, wherein the silica base particle described above is spherical; the ratio of a length of the particle to a breadth thereof falls in a range of 1.00 to 1.20; and the variation coefficient of the particle size distribution is 10% or less.

3. A glycols dispersion of silica base particles, wherein the silica base particles as described in claim 1 or 2 are dispersed in a glycols solvent in a concentration of 1 to 50% by weight.

4. A polyester film containing the silica particles as described in claim 1 or 2 in a proportion of 0.001 to 0.5% by weight.

5. A metallic article laminated with the polyester film as described in claim 4.

* * * * *